United States Patent
Goto et al.

[11] Patent Number: 5,903,205
[45] Date of Patent: May 11, 1999

[54] INDUCTION-TYPE ROTATIONAL POSITION DETECTING DEVICE

[75] Inventors: Atsutoshi Goto; Yasuhiro Yuasa, both of Fuchu; Shuichi Tanaka, Kodaira; Nobuyuki Akatsu, Higashiyamato; Kazuya Sakamoto, Hamura; Hiroshi Sakamoto, Kawagoe, all of Japan

[73] Assignee: Atsutoshi Goto, Tokyo, Japan

[21] Appl. No.: 08/693,405

[22] Filed: Aug. 7, 1996

[30] Foreign Application Priority Data

Aug. 10, 1995 [JP] Japan ................................ 7-225953

[51] Int. Cl.⁶ .................................................. H01F 21/06
[52] U.S. Cl. .......................... 336/130; 336/132; 336/134; 336/135
[58] Field of Search .................................. 336/130, 132, 336/134, 135

[56] References Cited

U.S. PATENT DOCUMENTS

| | | | |
|---|---|---|---|
| 2,484,022 | 11/1949 | Esval | 336/135 |
| 3,273,096 | 9/1966 | Lipshutz | 336/135 |
| 3,641,467 | 2/1972 | Ringland et al. | 336/135 |
| 4,631,510 | 12/1986 | Nagarkatti et al. | 336/135 |
| 4,743,786 | 5/1988 | Ichikawa et al. | 310/111 |
| 4,754,220 | 6/1988 | Shimizu et al. | 324/208 |
| 5,189,353 | 2/1993 | Ezuka | 318/605 |
| 5,349,293 | 9/1994 | Tanaka et al. | 324/207.16 |

FOREIGN PATENT DOCUMENTS

| | | |
|---|---|---|
| 59-028603 | 2/1984 | Japan . |
| 2049 939 | 12/1980 | United Kingdom . |

*Primary Examiner*—Renee S. Luebke
*Assistant Examiner*—Anh Mai
*Attorney, Agent, or Firm*—Graham & James LLP

[57] ABSTRACT

A group of secondary windings are distributively provided on a stator over a predetermined range, and the respective inductance of the secondary windings in the group is set in such a manner to present predetermined inductance distribution. A rotor has an eccentric shape so as to cause variations in magnetic coupling at individual poles of the stator in response to its current rotational position. By combined use of the magnetic coupling variations between primary and secondary windings on the stator and the predetermined inductance distribution of the secondary windings, high-accuracy detection of a rotational position is achieved with a simple structure. A plurality of primary windings may be set so as to present predetermined inductance distribution.

17 Claims, 11 Drawing Sheets

FIG. 7
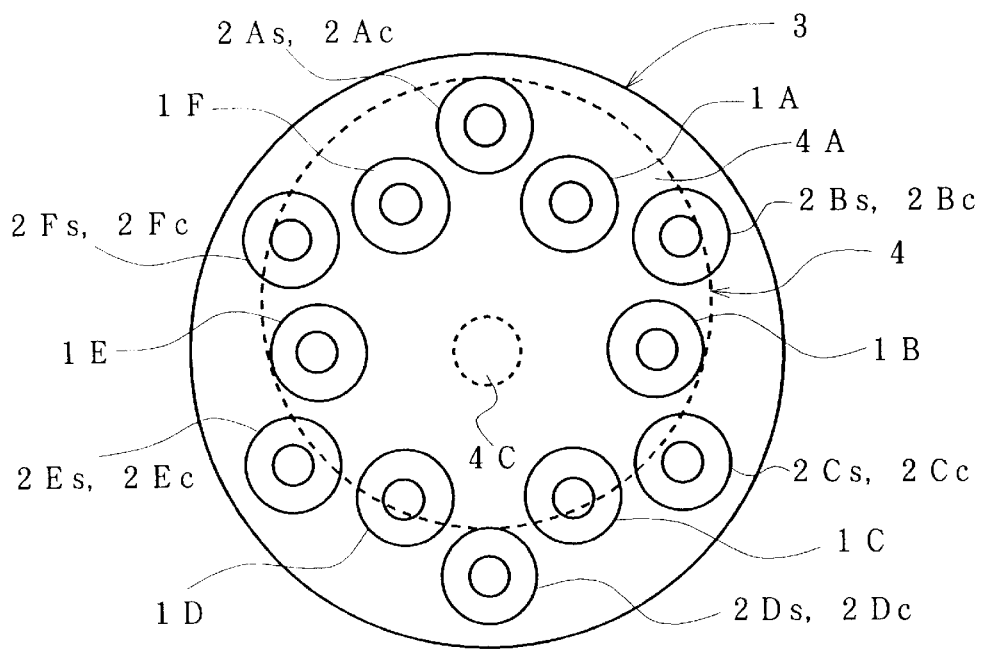
FIG. 8A
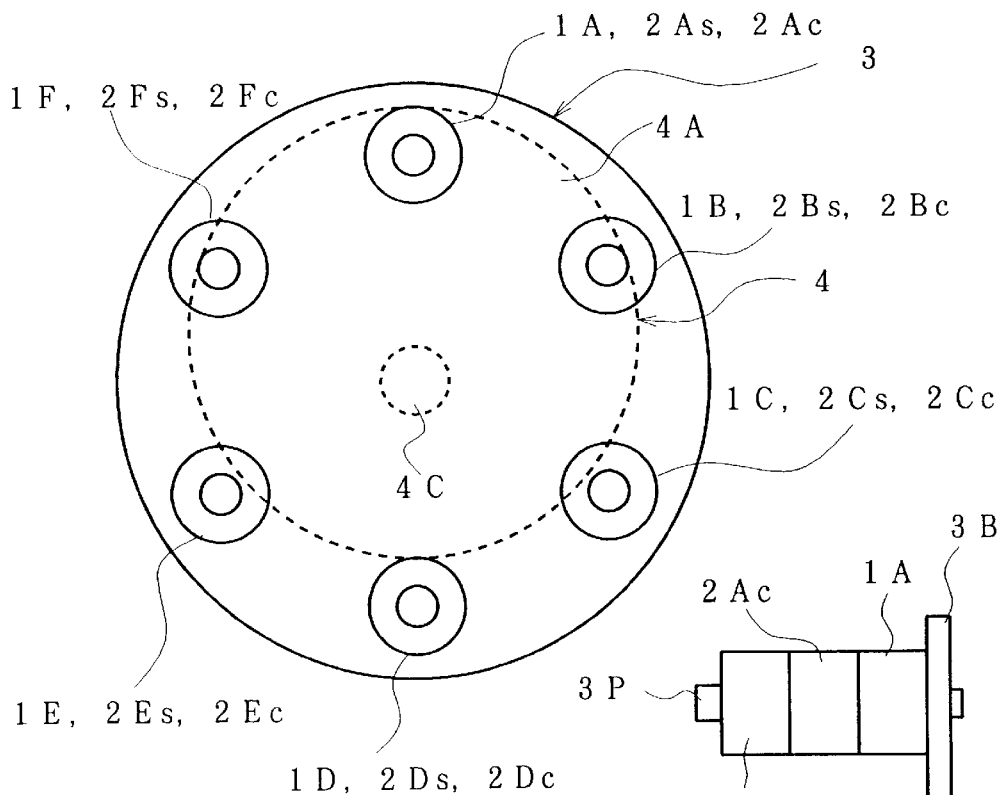
FIG. 8B

INDUCTION-TYPE ROTATIONAL POSITION DETECTING DEVICE

BACKGROUND OF THE INVENTION

The present invention relates generally to induction-type rotational position detecting devices and more particularly to an induction-type rotational position detecting device where the rotor has no windings and rotary transformer.

Among various induction-type rotational position detecting devices, those which are designed to produce two-phase (sine phase and cosine phase) outputs in response to a single-phase exciting input are commonly known as "resolvers", and those which are designed to produce three-phase outputs (phases shifted 120° in relation to each other) in response to a single-phase exciting input are known as "synchro" devices. The oldest-fashioned resolvers have double-pole (sine pole and cosine pole) secondary windings provided on the stator in such a manner to cross each other at a mechanical angle of 90°, with a primary winding provided on the rotor. However, the conventional resolvers of this type are disadvantageous in that they require brushes for electric contact with the primary winding on the rotor. Brushless resolvers eliminating the need for such brushes are also known, where a rotary transformer is provided on the rotor in place of the brushes. Because of the provision of the rotary transformer, the size of the resolver can not be reduced easily or can be reduced only to a limited degree. Also, the provision of the rotary transformer would result in an increased number of component parts necessary for the resolver and hence increased costs.

Non-contact/variable-reluctance-type rotational position detecting devices have been known under the tradename "microsyn", in which primary and secondary windings are provided on a plurality of projecting poles of the stator, and the rotor is formed of a magnetic body having a predetermined shape (eccentric circular or oval shape, or a shape having a projection). In such non-contact/variable-reluctance-type rotational position detecting devices, the gaps between the stator's projecting poles and the rotor's magnetic body are caused to vary in response to a changing rotational position of the rotor with reluctance variations occurring in response to the changing rotational position of the rotor, so that there are generated output signals corresponding to the reluctance variations. Also, similar rotational position detecting devices based on the variable reluctance principle are disclosed, for example, in Japanese Patent Laid-open Publication Nos. SHO-55-46862, SHO-55-70406 and SHO-59-28603. In connection with such devices, a phase-based position detecting method (where detected position data corresponds to an electrical phase angle of the output signal) and a voltage-based position detecting method (detected position data corresponds to a voltage level of the output signal) have both been known as methods for detecting positions based on the output signals of the devices. In the case where the phase-based position detecting method is employed, primary windings disposed at different mechanical angles are excited by plural-phase (e.g., two- or three-phase) exciting inputs to generate a single-phase output signal which varies in electrical phase angle in response to a changing rotational position of the rotor. In the case where the voltage-based position detecting method is employed, the relationship between the primary and secondary windings is reversed from the above-mentioned phase-based method, and plural-phase outputs (or a single-phase output having a peak amplitude level corresponding to a changing rotational position of the rotor) are generated in response to a single-phase exciting input as in the above-discussed "resolvers" or "synchro devices".

However, the above-mentioned non-contact/variable-reluctance-type rotational position detecting devices were unable to achieve good linearity of detected position data and high detecting accuracy because no winding means, such as primary and secondary windings and a rotary transformer, were provided on the rotor, although they were more suitable for achieving reduced size as compared to the conventional resolvers.

According to the study by the present inventor et al., one of the reasons for poor detecting accuracy of the prior art rotational position detecting devices where no winding means such as primary and secondary windings and a rotary transformer are provided on the rotor, is probably that the degree of magnetic coupling between the primary and secondary windings does not vary ideally in proportion to a changing rotational position of the rotor. For example, in the conventionally known variable-reluctance-type rotational position detecting devices, the rotor made of a magnetic body is formed into an eccentric circular, oval or gear-like shape or the like so that reluctance in a magnetic circuit passing through a given magnetic pole of the stator is caused to vary as the gap between the end of the magnetic pole on the stator and the rotor's magnetic body changes in response to a changing rotational position of the rotor. On the basis of the reluctance variation, the degree of magnetic coupling between the primary and secondary windings at the stator's magnetic pole changes in response to the rotational position, which induces in the secondary windings output signals corresponding to the rotational position.

In such a form of induction, variation in reluctance or in the degree of magnetic coupling based on the gap change at one point of a given magnetic pole of the stator would appreciably influence the detecting accuracy of the device, and thus high-accuracy detection output with good linearity could not be constantly obtained throughout an rotation of the rotor. Various attempts to solve these problems have been proposed to date, one typical example of which is to form the rotor into a special shape such as a heart or similar shape. Even though such an attempt may significantly improve the detecting accuracy, it does not appear so useful since it would require cumbersome designing as well as delicate manufacturing accuracy. Further, the fact that the gap change at one point of a given magnetic pole of the stator influences the detecting accuracy causes another problem that considerable manufacturing and assembling accuracy would be required for each of the magnetic poles of the stator.

SUMMARY OF THE INVENTION

It is therefore an object of the present invention to improve detecting accuracy of a rotational position detecting device of a type where no winding means, such as primary and secondary windings and rotary transformer, are provided on the rotor.

It is another object of the present invention to provide an induction-type rotational position detecting device which achieves improved linearity of detected position data.

It is still another object of the present invention to provide an induction-type rotational position detecting device which achieves improved detecting accuracy and improved linearity of detected position data with a simplified structure.

In order to accomplish the above-mentioned objects, an induction-type rotational position detecting device in accordance with one aspect of the present invention comprises a stator having primary and secondary windings placed thereon, and a rotor rotatable relative to the stator so as to vary magnetic coupling between the primary and secondary windings on the stator in response to a changing rotational position of the rotor, which is characterized in that at least one group of the secondary windings are placed on the stator and distributed over a predetermined rotational position range, and respective inductance of the secondary windings is set in such a manner to present desired inductance distribution over the predetermined rotational position range. The primary winding is excited by a single-phase exciting input at least in correspondence with the group, and respective outputs of the secondary windings are summed to generate a single output signal.

The induction-type rotational position detecting device in accordance with one aspect of the present invention is directed to defining a detecting device, such as a resolver or synchro device, where the primary winding is excited by a single-phase exciting input. That is, one group of the secondary windings are distributively placed on the stator over a predetermined rotational position range, and respective inductance of the secondary windings in that group is set in such a manner to present desired inductance distribution over the predetermined rotational position range. Therefore, when the rotor, having a peculiar shape (which may be any known or unknown eccentric shape such as an eccentric circular or oval shape or a shape having a projection) so as to cause variations in magnetic coupling at individual poles of the stator in response to its current rotational position, rotatively moves over the predetermined rotational position range, magnetic coupling variations occur in the secondary windings situated within the range in response to a changing rotational position of the rotor and levels of voltage induced in the individual secondary windings are determined in accordance with the inductance distribution. Looking at this occurrence on the basis of a given point (e.g., an initial point) within the predetermined rotational position range, not only the magnetic coupling at that point varies as a function of the rotor's rotational position, but also induced voltages of various levels corresponding to the inductance distribution are produced in the secondary windings within the range as a function of the rotor's rotational position. Consequently, by virtue of additive or multiplicative combined action of the two phenomena, an ultimate output signal resulting from summing respective outputs of the secondary windings in the group will have high accuracy and good linearity as a function of the rotational position of the rotor.

Because the present invention is not constructed to obtain variations in induction coefficients, responsive to a changing rotational position of the rotor, in dependence only on the shape of the rotor, the shaping, designing and manufacturing of the rotor are greatly facilitated, and sufficient detecting accuracy is achievable even when the detecting device is substantially reduced in size. Also, because the output signal is provided as a sum of the respective outputs of the individual secondary windings determined in accordance with desired inductance distribution within the predetermined rotational position range, a sort of averaging is effected, and this averaging is very advantageous in that it operates to minimize output errors even though the stator and rotor have some manufacturing and assembling errors. Namely, because the present invention can considerably lessen the assembling and manufacturing burdens, it can effectively promote reduction in costs and size of the detecting device while guaranteeing high detecting accuracy.

The inductance setting of the secondary windings may be done by variably setting the number of turns of each secondary winding in the group. Typically, the inductance distribution may be one presenting a characteristic of trigonometric function such as sine or cosine function.

Even when only one group of the secondary windings are provided, they can accomplish intended purposes of the rotational position detecting device because they generate a one-phase output signal indicative of a detected position. However, it is preferable that a plurality of such groups be provided in such a manner that the inductance distribution of the groups is shifted from each other by a predetermined mechanical angle so as to generate plural-phase detected position output signals. For example, if two groups of the secondary windings are provided in such a manner the inductance distribution of the groups is shifted from each other by a mechanical angle of about 90° so as to allow two-phase outputs to be generated in response to a single-phase exciting input, the detecting device of the present invention can be applied as a rotational position detecting device substantially equivalent to a known resolver. If three groups of the secondary windings are provided in such a manner the inductance distribution of the groups is shifted from each other by a mechanical angle of about 120° so as to allow three-phase outputs to be generated in response to a single-phase exciting input, the detecting device of the present invention can be applied as a rotational position detecting device substantially equivalent to a known synchro device. In such cases, the rotational position ranges covered by the individual groups may overlap with each other partly or as a whole. In this way, the secondary windings of different phases, i.e., different groups overlap at a same place or in a same range but yet present different inductance distribution (e.g., sine and cosine distribution), assume a complicated form of placement. Then, it will be seen even more clearly that the form of windings according to the present invention is very unique.

If the above-mentioned technical concept of the present invention is further developed, it will also be appreciated that the relationship between the primary and secondary windings may be reversed to implement a position detecting device.

The present invention, as the second aspect, provides an induction-type rotational position detecting device which comprises a stator having primary and secondary windings placed thereon, and a rotor rotatable relative to the stator so as to vary magnetic coupling between the primary and secondary windings on the stator in response to a changing rotational position of the rotor, the primary winding being excited by plural-phase exciting inputs, and which is characterized in that the rotational position detecting device includes, in correspondence with the plural-phase exciting inputs, groups of the secondary windings placed on the stator and distributed over a predetermined rotational position range, and respective inductance of the secondary windings in each of the groups is set in such a manner to present desired inductance distribution over the predetermined rotational position range, the inductance distribution of the groups being shifted from each other by a predetermined mechanical angle.

This rotational position detecting device according to the second aspect of the present invention is directed to defining a so-called phase-based position detecting device where a plurality of primary windings placed in correspondence with different mechanical angles are excited by plural-phase A.C. signals so as to generate a single-phase output signal that presents a phase shift corresponding to a changing rotational position of the rotor. This device also affords various advantageous results, such as improved detecting accuracy, for reasons similar to the above-mentioned.

If the above-mentioned technical concept of the present invention is further developed, it will also be appreciated that a group of the secondary or primary windings covering a predetermined rotational position range may comprise a series of distributed windings.

In view of this, the present invention, as the third aspect, provides an induction-type rotational position detecting device which comprises a stator having primary and secondary windings placed thereon, and a rotor rotatable relative to the stator so as to vary magnetic coupling between the primary and secondary windings of the stator in response to a changing rotational position of the rotor, and which is characterized in that the rotational position detecting device includes at least one group of either of the primary and secondary windings distributively wound on the stator in such a manner to present desired inductance distribution over a predetermined rotational position range. The distributed windings, although cumbersome work may be involved in manufacturing them, can be practiced as a useful modification of the present invention.

BRIEF DESCRIPTION OF THE DRAWINGS

For better understanding of the above and other features of the present invention, the preferred embodiments of the invention will be described in detail below with reference to the accompanying drawings, in which:

FIG. 7 is a schematic front view showing another embodiment of the rotational position detecting device in accordance with the present invention;

FIGS. 8A and 8B are a schematic front view and a fragmentary side view showing still another embodiment of the rotational position detecting device in accordance with the present invention;

DETAILED DESCRIPTION OF THE PREFERRED EMBODIMENTS

Figure 1:
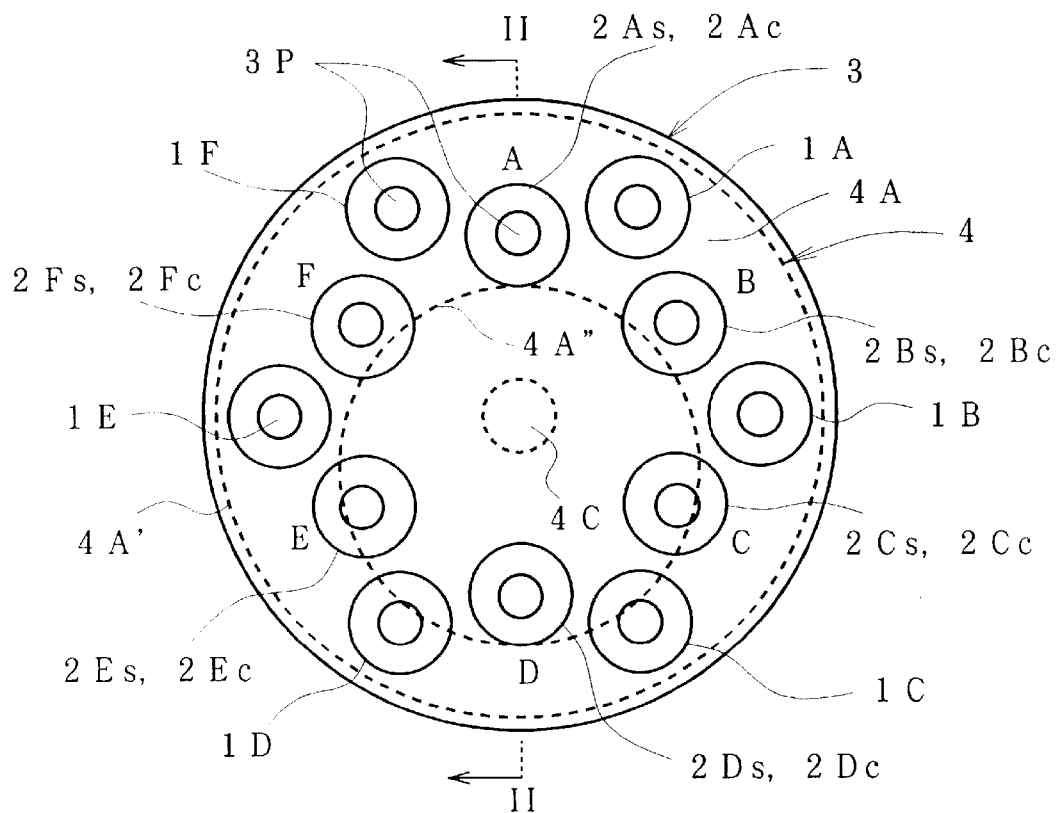
FIG. 1 is a schematic front view showing an embodiment of a rotational position detecting device in accordance with the present invention.
Figure 2:
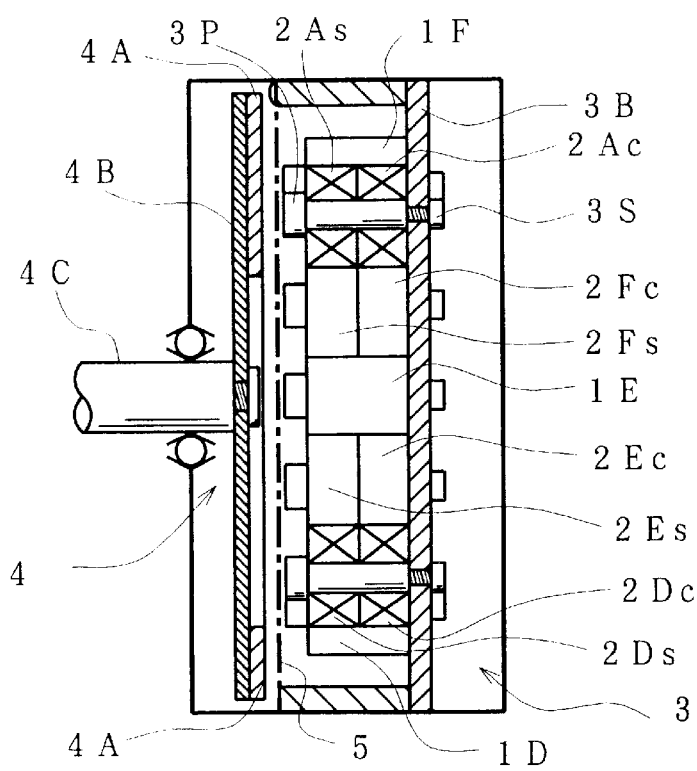
FIG. 2 is a schematic sectional view taken along the line II—II of FIG. 1.

FIGS. 1 to 4 show a rotational position detecting device of a type where primary windings are excited by a single-phase exciting input and two-phase (i.e., sine-phase and cosine-phase) outputs are generated by secondary windings in a similar manner to conventional resolvers. FIG. 1 is a schematic front view showing the rotational position detecting device, and FIG. 2 is a schematic sectional view taken along the line II—II of FIG. 1.

In a stator 3 of the rotational position detecting device, six poles A, B, C, D, E and F are disposed along the circumferential direction of the stator 3 and equally spaced apart from each other by about 60°, and two overlapping secondary windings 2As, 2Ac; 2Bs, 2Bc; 2Cs, 2Cc; 2Ds, 2Dc; 2Es, 2Ec; 2Fs, 2Fc are provided on each of the poles A, B, C, D, E. These secondary windings form two groups; one of the groups is constituted by the secondary windings 2As, 2Bs, 2Cs, 2Ds, 2Es and 2Fs and corresponds to a sine phase, while the other group is constituted by the secondary windings 2Ac, 2Bc, 2Cc, 2Dc, 2Ec and 2Fc and corresponds to a cosine phase.

Respective inductance of the first-group secondary windings 2As, 2Bs, 2Cs, 2Ds, 2Es and 2Fs are set in such a manner to present desired inductance distribution (corresponding to a sine function in this embodiment) over a predetermined rotational position range (a range of one complete rotation in the embodiment). Similarly, respective inductance of the second-group secondary windings 2Ac, 2Bc, 2Cc, 2Dc, 2Ec and 2Fc are set in such a manner to present desired inductance distribution (corresponding to a cosine function in this embodiment) over a predetermined rotational position range (a range of one complete rotation in the embodiment).

Figure 3:
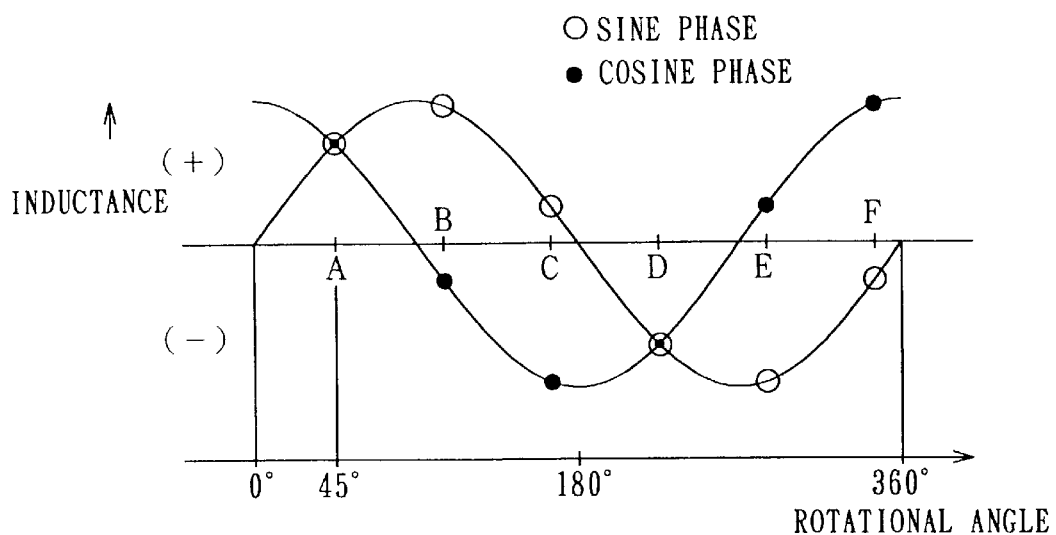
FIG. 3 is a graph showing an example of inductance distributin that is set for two groups of secondary windings shown in FIG. 1.

In FIG. 3, there is shown examples of the desired inductance distribution. These examples assume that the secondary windings 2As and 2Ac provided at the A pole in each of the groups are set at an angular position displaced from an initial rotational position (rotational angle 0°) by 45°. Thus, in this example, the positions of the poles A to F for the secondary windings correspond to mechanical angles 45°, 105°, 165°, 225°, 285° and 345°, respectively. The inductance of each of the secondary windings is set to a value corresponding to its mechanical angular position in the associated inductance distribution function. That is, in the illustrated example of FIG. 3, the inductance of the secondary windings 2As, 2Bs, 2Cs, 2Ds, 2Es and 2Fs in the sine-phase group is set in correspondence with functional values denoted in white small circles along the sine function curve, while the inductance of the secondary windings 2Ac, 2Bc, 2Cc, 2Dc, 2Ec and 2Fc in the cosine-phase group is set in correspondence with functional values denoted in black small circles along the cosine function curve. For example, the desired inductance setting of each of the secondary windings may be done by setting the number of its coil turns as conventionally known in the art. Therefore, in this example, the basic inductance values of the individual secondary windings are set on the basis of the following functional values.

Sine-phase secondary windings:
2As: sin 45°
2Bs: sin 105°
2Cs: sin 165°
2Ds: sin 225°
2Es: sin 285°
2Fs: sin 345°
Cosine-phase secondary windings:
2Ac: cos 45°
2Bc: cos 105°
2Cc: cos 165°
2Dc: cos 225°
2Ec: cos 285°
2Fc: cos 345°

Figure 4:
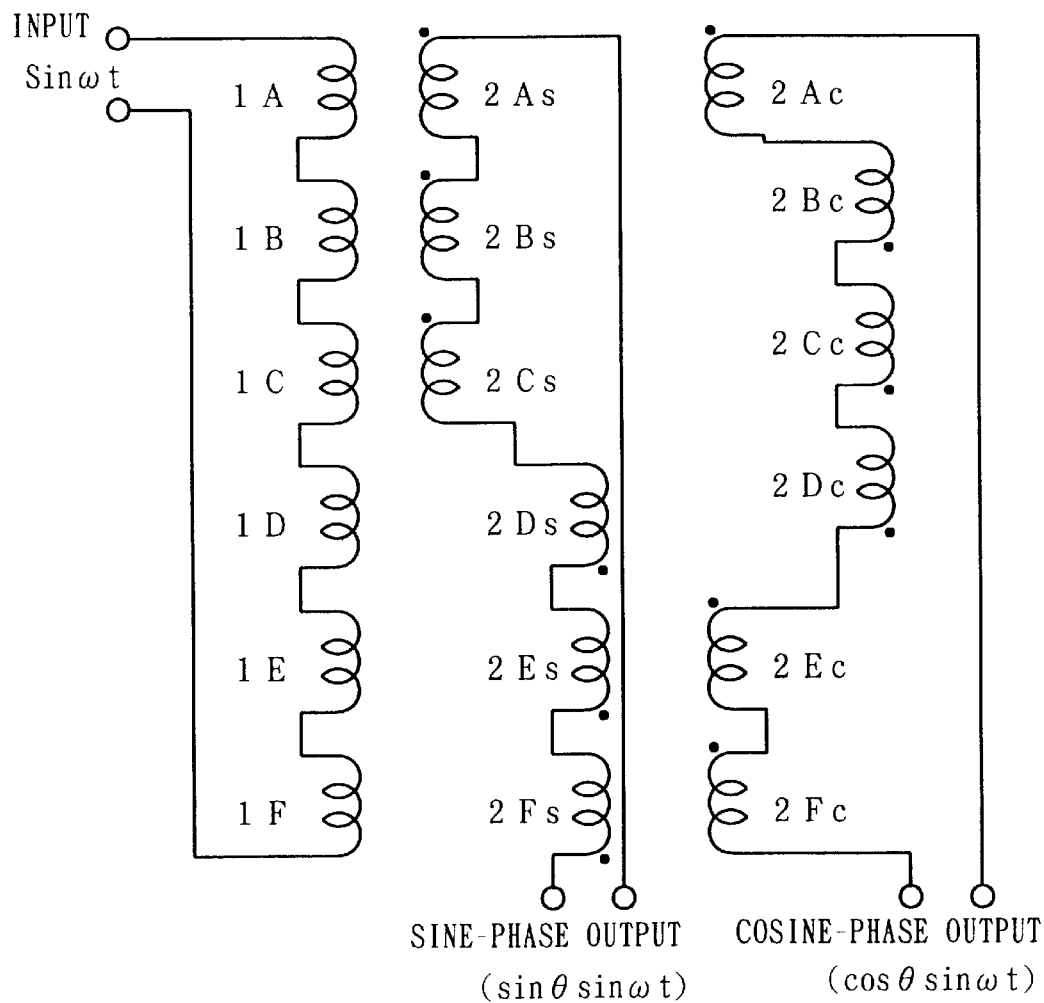
FIG. 4 is a winding diagram showing exemplary excitation of primary windings and exemplary connection of the secondary windings.

In the example, inductance corresponding to negative (minus) values is set by reversing the winding directions of the windings. Thus, it can be said that the sine-phase group is comprised of one subgroup of the secondary windings 2As, 2Bs and 2Cs that are wound in the forward direction and another subgroup of the secondary windings 2Ds, 2Es and 2Fs that are wound in the opposite direction. The secondary windings in each of the groups are connected in series with each other as shown in FIG. 4 so that their induced outputs are summed so as to generate a sine-phase output (sin $\theta$ sin $\omega t\xi$, if the A.C. component and detected angle are represented by sin $\omega t$ and $\theta$, respectively). Similarly, it can be said that the cosine-phase group is comprised of one subgroup of the secondary windings 2Ac, 2Bc and 2Cc that are wound in the forward direction and another subgroup of the secondary windings 2Dc, 2Ec and 2Fc that are wound in the opposite direction. The secondary windings in each of the groups are connected in series with each other as shown in FIG. 4 so that their induced outputs are summed so as to generate a cosine-phase output (cos $\theta$ sin $\omega t$).

While the respective inductance of the individual secondary windings is set in the above-mentioned example on the assumption that the "A" pole is substantially at the angular position of 45°, this is only illustrative. The respective inductance may be set with the positions of the individual secondary windings in the desired inductance distribution function shifted appropriately from the foregoing. For example, if the A pole is positioned at the initial rotational angle $\theta$, the basic inductance values of the individual secondary windings will be set on the basis of the following functional values.

Sine-phase secondary windings:
2As: sin 0°
2Bs: sin 60°
2Cs: sin 120°
2Ds: sin 180°
2Es: sin 240°
2Fs: sin 300°
Cosine-phase secondary windings:
2Ac: cos 0°
2Bc: cos 60°
2Cc: cos 120°
2Dc: cos 180°
2Ec: cos 240°
2Fc: cos 300°

In the above-mentioned example, the secondary windings 2As and 2Ds may be omitted because sin 0° and sin 180° represent a value of 0. This shows that a certain relationship between the shape of the desired inductance distribution and the positions of the secondary windings may lead to a self-inductance value of "0", making some of the windings unnecessary. In addition, the windings do not necessarily have to be provided at equal intervals, and thus, where the theoretical self-inductance is zero, the positions of the secondary windings may be shifted so as to provide an appropriate value of the self-inductance.

Further, in the stator 3 of the embodiment shown in FIGS. 1 and 2, a plurality of primary windings 1A, 1B, 1C, 1D, 1E and 1F are disposed along a circle that is concentric with and greater in diameter than the circle along which the secondary windings 2As to 2Fs and 2Ac to 2Fc are disposed. Poles for the primary windings 1A to 1F (primary poles) are disposed between the poles A to F for the secondary windings (secondary poles) alternately, so that the primary and secondary poles are placed in a staggered fashion. This staggered placement is useful in that it permits the primary and secondary poles to be placed compactly in a limited stator space. Each of the primary windings 1A to 1F is excited by a single-phase A.C. signal (e.g., sin $\omega t$) as shown in FIG. 4.

With reference to FIG. 2, the following paragraph describes how the individual windings are provided in the stator 3. A pin-shaped core 3P, made of a ferromagnetic material such as iron, is provided for each of the poles for the primary windings 1A to 1F and for each of the poles A to F for the secondary windings 2As to 2Fs and 2Ac to 2Fc. The primary windings 1A to 1F and secondary windings 2As to 2Fs and 2Ac to 2Fc are set on the corresponding pin-shaped cores 3P. The pin-shaped cores 3P are then secured to a stator base 3B via screws 3S or the like in predetermined arrangement as shown in FIG. 1. This greatly simplifies the manufacture and assembly of the stator 3, thus greatly reducing the manufacturing costs. It should be obvious that the present invention is not limited to such manufacturing and assembly of the stator 3. If the manufacture and assembly of the stator 3 as above mentioned is employed, assembling errors may occur in positioning the poles for the primary windings 1A to 1F and the poles A to F for the secondary windings 2As to 2Fs and 2Ac to 2Fc, and hence error-free accurate assembly is highly desirable. As an option to forestall such an adverse influence, a core sheet 5 may be provided in contact with the end surfaces of the pin-shaped cores 3P as shown by a one-dot-dash line in FIG. 1. The core sheet 5 will be later described in detail.

Referring now to an exemplary structure of a rotor 4, the rotor 4 is generally in a plate shape and includes a base plate 4B mounted on a rotation shaft 4C to which rotating movement of an object to be detected is transmitted, and a magnetic coupling changing member 4A provided on one surface of the base plate 4B. The magnetic coupling changing member 4A, which constitutes a principal part of the rotor 4, operates to change magnetic coupling between the primary and secondary windings of the stator 3 depending on a current rotational position of the rotor 4. For instance, the magnetic coupling changing member 4A is made of a ferromagnetic material such as iron, which has an outer outline in the form of a real circle that is sized to cover or receive therein the placement of the primary windings 1A to 1F disposed closer to the outer periphery of the stator 3 as denoted at 4A' in FIG. 1 and also has an eccentric inner outline as denoted at 4A" in FIG. 1. Namely, the magnetic coupling changing member 4A is generally in the shape of a collar having its central portion punched eccentrically to form an eccentric central opening. The eccentric inner outline 4A" of the rotor's magnetic coupling changing member 4A is formed appropriately in such a manner that the areas of the changing member 4A facing the respective end surfaces of the individual magnetic poles A to F in the secondary windings placement vary as the rotor 4 rotates on the shaft 4C (e.g., in such a manner that one cycle of variation in the end surface areas occurs per rotation of the rotor 4). The base plate 4B of the rotor 4 is made of a non-magnetic material and may be made of an electric conductor such as copper.

Because of the above-mentioned arrangement, the magnetic coupling between the primary and secondary windings at the individual poles A to F in the stator 3 is caused to vary in a periodic function at a rate of one cycle per rotation as the rotor 4 rotates on the shaft 4C. As well known from conventional resolvers or other rotation detectors, such variations in the magnetic coupling based on the eccentric shape of the rotor present sine-phase and cosine-phase variations with respect to two secondary windings that are displaced from each other by a mechanical angle of 90°. However, unless the shape of the rotor is designed properly enough, the magnetic coupling variations based on the eccentric shape of the rotor alone can not achieve ideal functional variations and would present problems as to detecting accuracy and linearity of detected data. In contrast, the present invention is characterized by variably setting the inductance distribution of the individual secondary windings 2As to 2Fs and 2Ac to 2Fc within a predetermined rotational position range in such a manner to achieve ideal functional variations, so that it can easily enhance detecting accuracy.

More specifically, as the rotor 4 rotates on the shaft 4C, there occur variations of the magnetic coupling in the individual secondary windings 2As to 2Fs and 2Ac and 2Fc depending on a changing rotational position of the rotor 4, and levels of voltage induced in the secondary windings 2As to 2Fs and 2Ac and 2Fc will follow the above-mentioned inductance distribution. Considering this occurrence on the basis of a specific point (e.g., the initial point) of the rotor 3, not only the magnetic coupling at the specific point varies as a function of the rotational position of the rotor 4, but also induced voltages of various levels corresponding to the inductance distribution of the individual groups occur in the secondary windings in the groups as a function of the rotational position of the rotor 4. Consequently, by virtue of additive or multiplicative combined action of the two phenomena, an output signal obtained by summing respective outputs of the secondary windings in each of the groups will have high accuracy and good linearity as a function of the rotational position of the rotor 4.

Figure 6:
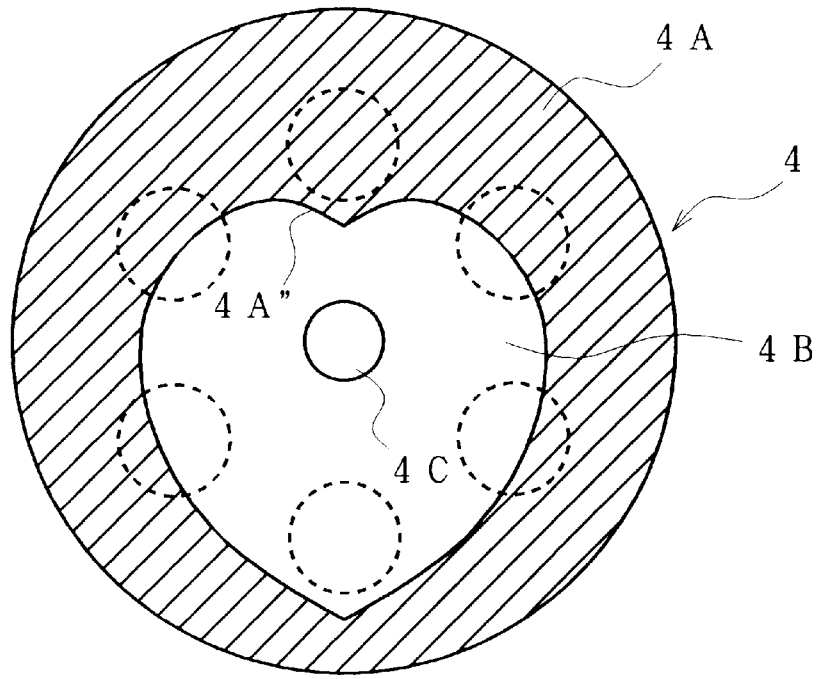
FIG. 6 is a schematic front view showing another modification of the shape of the magnetic coupling changing member.

For example, as two-phase output signals of a resolver, a sine-phase output signal (e.g., $\sin\theta \sin\omega t$) should be generated from one group of the secondary windings 2As to 2Fs while a cosine-phase output signal (e.g., $\cos\theta \sin\omega t$) should be generated from the other group of the secondary windings 2Ac to 2Fc. The present invention can easily obtain such ideal output signals. Namely, by making the inductance distribution of the secondary windings 2As to 2Fs of the sine-phase group correspond to a sine function as plotted in FIG. 3, variation in the inductance L in this group that is responsive to variation in a rotational position $\theta$ of the rotor 4 will represent an equation of $L=\sin\theta$. Although the actual inductance L does not vary continuously in response to continuous variation of the rotational position $\theta$ but is represented by connecting six points as shown in FIG. 6, an ideal output signal can be obtained easily as mentioned above by the inductance variations based on the inductance distribution of the secondary windings and also the additive or multiplicative action of continuous variations of magnetic coupling responsive to the rotation of the rotor 4. The same is true with the cosine phase.

According to the present invention, variations in induction coefficients, responsive to changing rotational positions of the rotor 4, are not obtained in dependence only on the shape of the magnetic coupling changing member 4A of the rotor 4, the shaping, designing and manufacturing the member 4A can be done with increased ease, and sufficient detecting accuracy can be provided even if the device is reduced in size. Also, because the output signal is provided as a sum of outputs of the individual secondary windings 2As to 2Fs and 2Ac to 2Fc according to desired inductance distribution within a predetermined rotational position range, a sort of averaging is effected, and this averaging is very advantageous in that it operates to minimize output errors even when the stator and rotor have some manufacturing and assembling errors. Namely, because the present invention can considerably lessen the assembling and manufacturing burdens, it can effectively promote reduction in costs and size of the device while assuring high accuracy.

Because the ideal setting of the inductance distribution of the secondary windings in the above-mentioned manner considerably contributes to obtaining ideal output signals, the magnetic coupling changing member 4A of the rotor 4 may have any desired shape as long as the changing member 4A, in effect, causes magnetic coupling variations between the primary and secondary windings in response to the rotation of the rotor 4.

Figure 5:
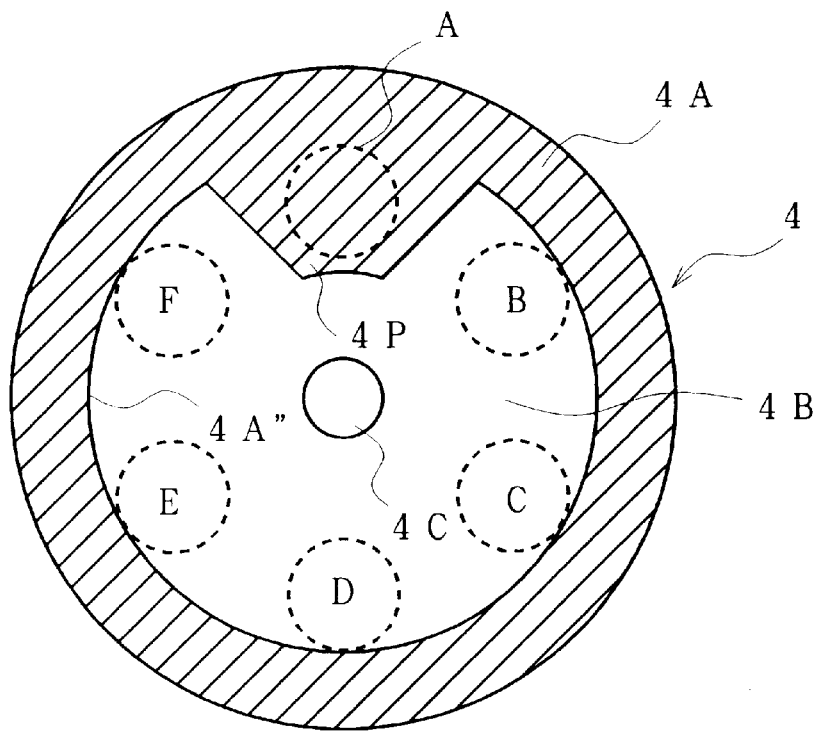
FIG. 5 is a schematic front view showing a modification of the shape of a magnetic coupling changing member in a rotor.

FIGS. 5 and 6 show modified shapes of the magnetic coupling changing member 4A of the rotor 4. In the example of FIG. 5, the magnetic coupling changing member 4A includes an inner outline 4A" that generally forms a shape of a real circle and has an radial inward projection 4P on one portion thereof. There is produced greatest magnetic coupling between the primary and secondary windings at one of the poles A to F for the secondary windings proximate to the radial inward projection 4P, so that periodic variations in the magnetic coupling occur in response to the rotation of the rotor 4. Even magnetic coupling variations based on such a simple projection 4P can guarantee ideal output characteristics through the inductance distribution, and therefore it can be sufficiently practical. In the example of FIG. 6, the magnetic coupling changing member 4A includes an inner outline 4A" that is generally shaped like a heart. It has been confirmed today that periodic variations in the magnetic coupling obtained by the heart-like shape in response to the rotation of the rotor 4 is more advantageous than the eccentric shape as shown in FIG. 1.

While the magnetic coupling changing member 4A in the described examples is preferably made of a ferromagnetic material such as iron, it may be made of a good electric conductor such as copper. If a good electric conductor such as copper is used for the magnetic coupling changing member 4A, eddy currents would flow in the conductor as the changing member 4A sequentially approaches any of the the magnetic poles A to F and a resultant loss reduces the magnetic coupling, so that variations in the magnetic coupling responding to the changing rotational position of the rotor 4 are produced between the primary and secondary windings. In such a case, the base plate 4B of the rotor 4 is made of a non-conductor material, e.g., a magnetic material such as iron.

The relationship between the primary and secondary poles in the embodiment of FIG. 1 may be reversed. Namely, as shown in FIG. 7, the poles on which the secondary windings 2As to 2Fs and 2Ac to 2Fc are provided, may be disposed closer to the outer periphery of the stator 3 with the poles for the primary windings 1A to iF being disposed along the smaller-diameter circle. In this case, the magnetic coupling changing member 4A of the rotor 4 is formed to have a normal eccentric shape, rather than being punched in its central portion as shown in FIG. 1.

Alternatively, the primary windings may be provided at the same poles as the secondary windings 2As to 2Fs and 2Ac to 2Fc as shown in FIGS. 8A and 8B. FIG. 8B is a view of one of the poles A as viewed from its side, which shows that the primary winding 1A and two secondary windings 2As and 2Ac are provided on one of the pins 3P in an overlapping fashion. In this case, the magnetic coupling changing member 4A of the rotor 4 may be cut away in its central portion as shown in FIG. 1 or may be formed to have a normal eccentric shape as shown in FIG. 8A.

Figure 9:
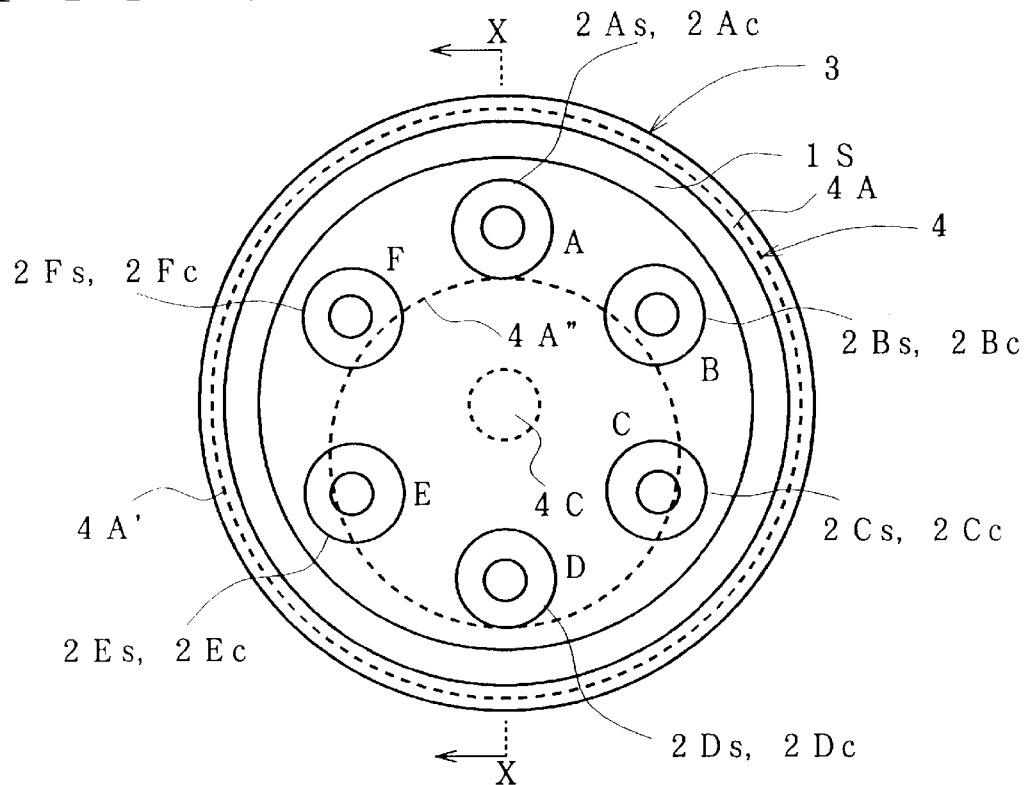
FIG. 9 is a schematic front view showing yet another embodiment of the rotational position detecting device in accordance with the present invention.
Figure 10:
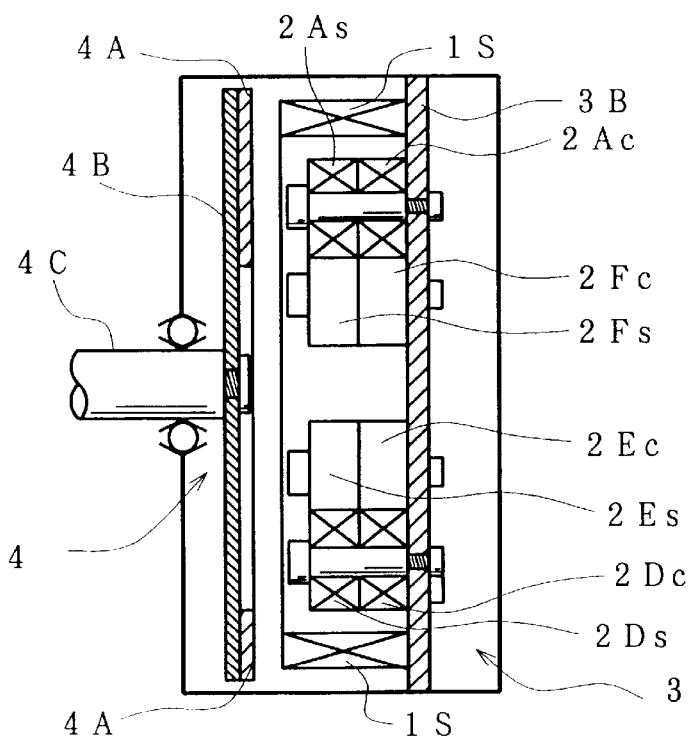
FIG. 10 is a schematic sectional view taken along the line X—X of FIG. 9.

Still another modification is shown in FIG. 9, where a single primary winding 1S is provided in the stator 3 along the entire outermost periphery thereof and the plurality of the poles A to F for the secondary windings 2As to 2Fs and 2Ac to 2Fc are disposed radially inwardly of the peripheral primary winding 1S. FIG. 10 is a schematic sectional view taken along the line X—X of FIG. 9. With this modified arrangement, a magnetic field produced via the peripheral primary winding 1S can be applied uniformly to the secondary poles A to F during one rotation and the efficiency of the magnetic coupling at each of the secondary poles A to F can be increased, so that the detecting accuracy can be enhanced even further. The modified arrangement is also very convenient in that it simplifies the structure for placing the primary winding. In this case, the rotor 4 may be constructed similarly to the embodiment shown in FIGS. 1 and 2.

As a modified form of the construction of FIGS. 9 and 10, the single primary winding 1S may be provided close to the inner periphery of the stator 3, i.e., inwardly of the circular placement of the secondary poles A to F.

For each of the modified stators 3 discussed above with reference to FIGS. 7 to 10, the rotor 4 cooperating therewith may of course employ one of the various modifications about the shape and material of the magnetic coupling changing member 4A as necessary.

Figure 11:
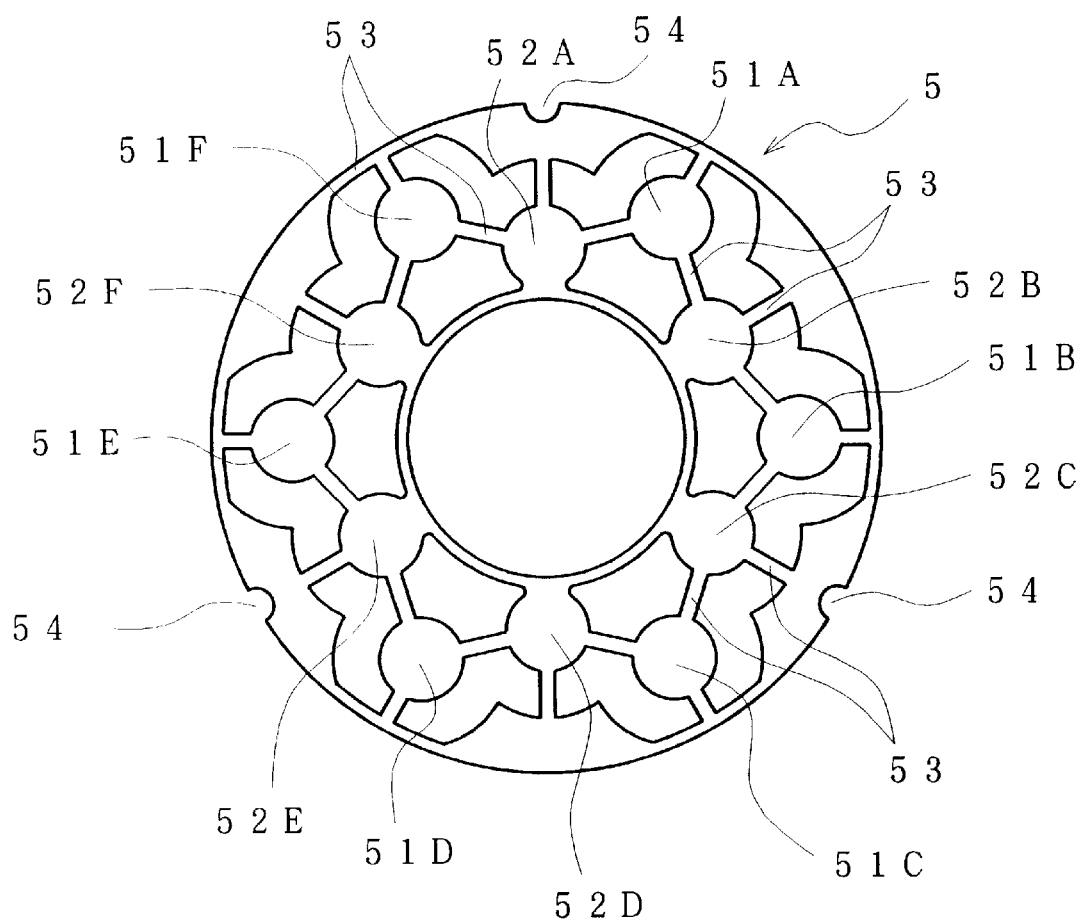
FIG. 11 is a schematic front view showing an example of a core sheet shown in FIG. 2.

FIG. 11 is a plan view showing a detail of the core sheet 5 which may be provided in contact with the end surfaces of the pin-shaped cores 3P in the stator 3 of FIG. 2. The core sheet 5 is formed by punching, via a press or the like, a sheet of a ferromagnetic material such as iron, and it includes magnetic pole portions 51A to 51F disposed in exact positional correspondence with the magnetic poles for the primary windings 1A to 1F and other magnetic pole portions 52A to 52F disposed in exact positional correspondence with the magnetic poles for the secondary windings 2As to 2Fs and 2Ac to 2Fc. The magnetic pole portions 51A to 51F, 52A to 52F are interconnected via a plurality of branch portions 53. The thus-constructed core sheet 5 is provided in contact with the end surfaces of the pin-shaped cores 3P for the primary and secondary poles of the stator 3 and secured by means of any suitable means. In this way, the primary and secondary poles of the stator 3 are, in effect, compulsorily adjusted to the positions of the corresponding magnetic pole portions 51A to 51F, 52A to 52F of the core sheet 5, so that accurate placement of the magnetic poles is achieved. Thus, despite the above-mentioned inexpensive stator structure which is very easy to manufacture and assemble and where the stator 3 is constructed by securing, via screws or the like, the pin-shaped cores 3P having the necessary windings thereon to the stator base 3B, positioning errors of the magnetic poles based on the assembling errors can be automatically corrected by means of the core sheet 5. The core sheet 5 can be formed, by a very simple pressing step, to have an accurate arrangement of the magnetic poles very easily and at very low costs. Because a certain degree of errors in assembling the stator 3 can be corrected by the core sheet 5 as mentioned earlier, the present invention affords an advantage that the manufacturing and assembling the stator 3 do not require very high accuracy.

The core sheet 5 has key engaging recesses 54 formed in several (three in the illustrated example) places along the outer periphery thereof, so that as the core sheet 5 is placed in contact with the end surfaces of the pin-shaped cores 3P of the primary and secondary poles in the stator 3, the recesses 54 are brought into engagement with key engaging protrusions (not shown) formed on the stator 3 so as to set the core sheet 5 in a predetermined position.

If the diameter of the detecting device is made small or extra small, adverse effects of a magnetic leakage may arise due to the presence of the branch portions 53, and thus it may sometimes be desirable to not provide the core sheet 5.

It should be obvious that the stator 3 may, rather than being manufactured and assembled in a simplified and advantageous manner as proposed above, be of the conventionally known construction; for example, the stator 3 may comprise a multiplicity of core pieces layered one on another to form multi-pole stator cores and windings provided on the poles.

Figure 12:
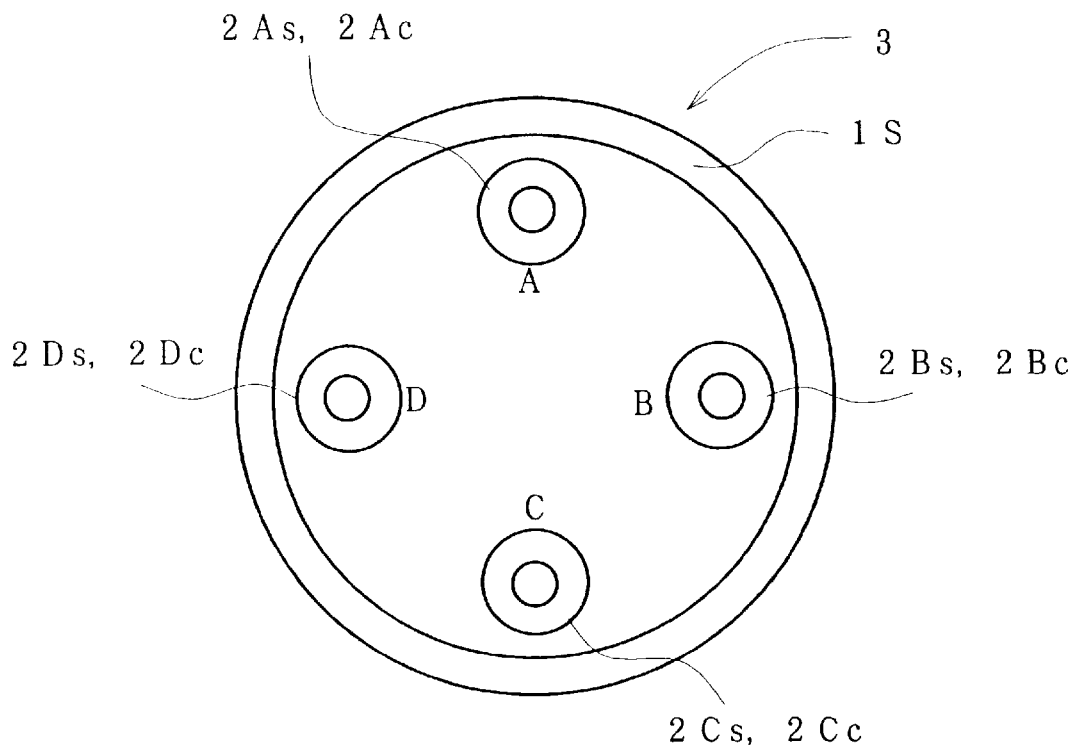
FIG. 12 is a schematic front view showing a stator in still another embodiment of the rotational position detecting device in accordance with the present invention.

Although the number of secondary windings forming one group in the stator 3 is "six", it is just illustrative and may of course be any other number. FIG. 12 shows an example where four secondary windings form one group in the stator 3, and FIG. 14 shows an example where eight secondary windings form one group in the stator 3.

Figure 13:
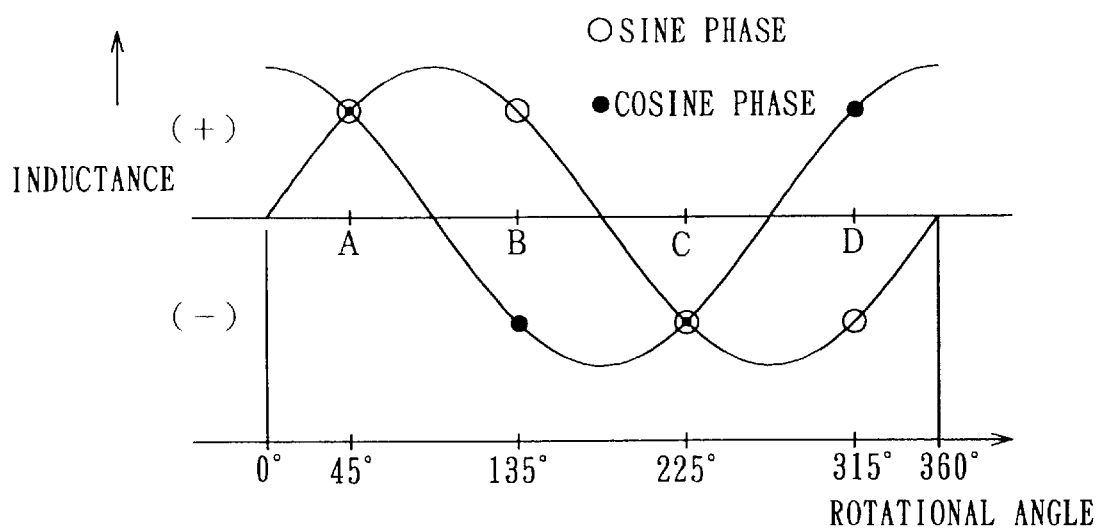
FIG. 13 raph showing an example of inductance distribution that is set for two groups of secondary windings shown in FIG. 12.

In the example of FIG. 12, the stator 3 includes four poles A, B, C and D spaced from each other by an angle of 90°, and the secondary windings 2As to 2Ds of the sine-phase group and the secondary windings 2Ac to 2Dc of the cosine-phase group are provided on the four poles A, B, C and D, one pair of the sine- and cosine-group secondary windings on each pole. In this case, inductance distribution for the secondary windings of each of the groups is set, for example, as shown in FIG. 13. In the example of FIG. 13, the respective inductance of the secondary windings is set with the poles A to D being placed at mechanical angles 45°, 135°, 225° and 315°, respectively, but they may be displaced optionally similarly to the above-mentioned embodiments.

Figure 14:
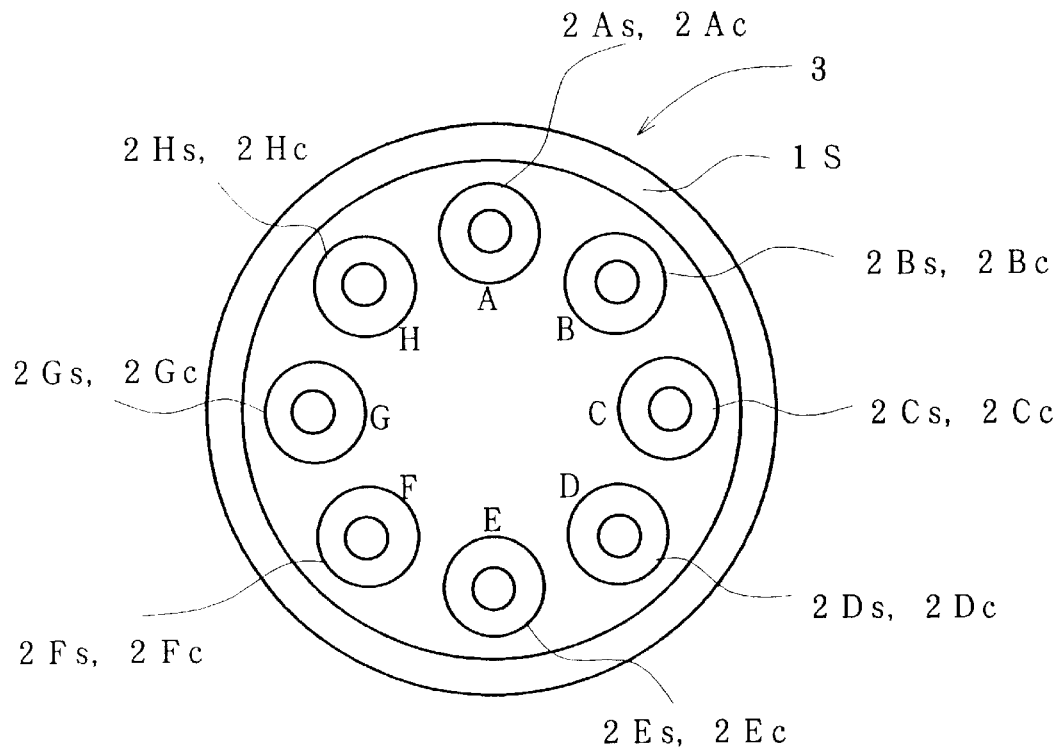
FIG. 14 is a schematic front view showing a stator in still another embodiment of the rotational position detecting device in accordance with the present invention.
Figure 15:
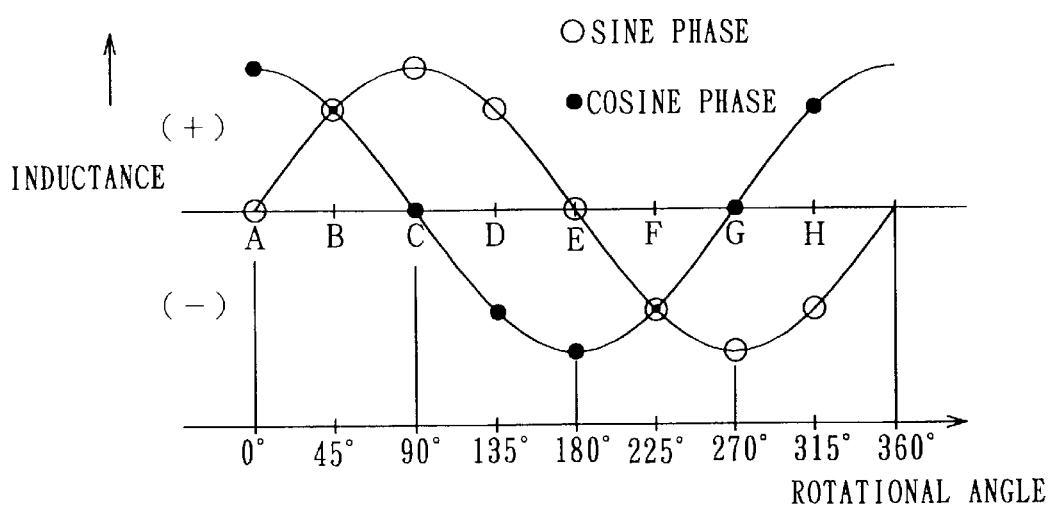
FIG. 15 is a graph showing an example of inductance distribution that is set for two groups of secondary windings shown in FIG. 14.

In the example of FIG. 14, the stator 3 includes eight poles A, B, C, D, E, F, G and H spaced from each other by an angle of 45°, and the secondary windings 2As to 2Hs of the sine-phase group and the secondary windings 2Ac to 2Hc of the cosine-phase group are provided on the eight poles A, B, C, D, E, F, G and H, one pair of the sine- and cosine-group secondary windings on each pole. In this case, inductance distribution for the secondary windings of each of the groups is set, for example, as shown in FIG. 15. In the example of FIG. 15, the respective inductance of the secondary windings is set with the poles A to H being placed at mechanical angles 0°, 45°, 90°, 135°, 180°, 225°, 270° and 315°, respectively, but they may be displaced optionally similarly to the above-mentioned embodiments. Also, as previously noted, those windings for which inductance values are "0" (e.g., sin 0°, sin 180°, cos 90° and cos 270°) may be omitted. If the windings are not to be omitted, the angles at which the poles A to H are placed may be slightly shifted because they do not necessarily have to be provided at equal intervals.

In FIGS. 12 and 14, the stator 3 includes a single peripheral primary winding 1S as in the example of FIG. 9, but a plurality of the primary windings may be provided and constructed as in any of the various embodiments described above. Also, while illustration of the rotor is omitted in FIGS. 12 and 14, the rotor may be constructed as in any of the various embodiments described above.

Although the rotational position detecting device has been described above which yields two-phase output signals as produced by a resolver, the detecting device according to the present invention can also be constructed to yield three-phase output signals as produced by a synchro device. To this end, three groups of the secondary windings may be provided, and respective inductance values of the windings may be set in such a manner that inductance distribution for the individual groups present characteristics of sin θ, sin (θ+120°) and sin (θ+240°). The detecting device according to the present invention can also be constructed to yield multi-phase output signal. Each pair of the sine- and cosine-phase windings may be wound around separate poles rather than being wound around the same pole in an overlapping fashion. But, winding each pair of the sine- and cosine-phase windings is more advantageous in that it can reduce the number of the poles and the size of the device.

Where a one-phase output signal is sufficient, only one group of the secondary windings may be provided. For example, in the example of FIG. 1, the secondary windings 2As to 2Fs of the sine-phase group may be provided and the other secondary windings 2Ac to 2Fc of the cosine-phase group may be omitted. In such a case, the primary winding structure, rater than the second winding structure, may be constructed of a plurality of windings that are set to present desired inductance distribution.

Figure 16:
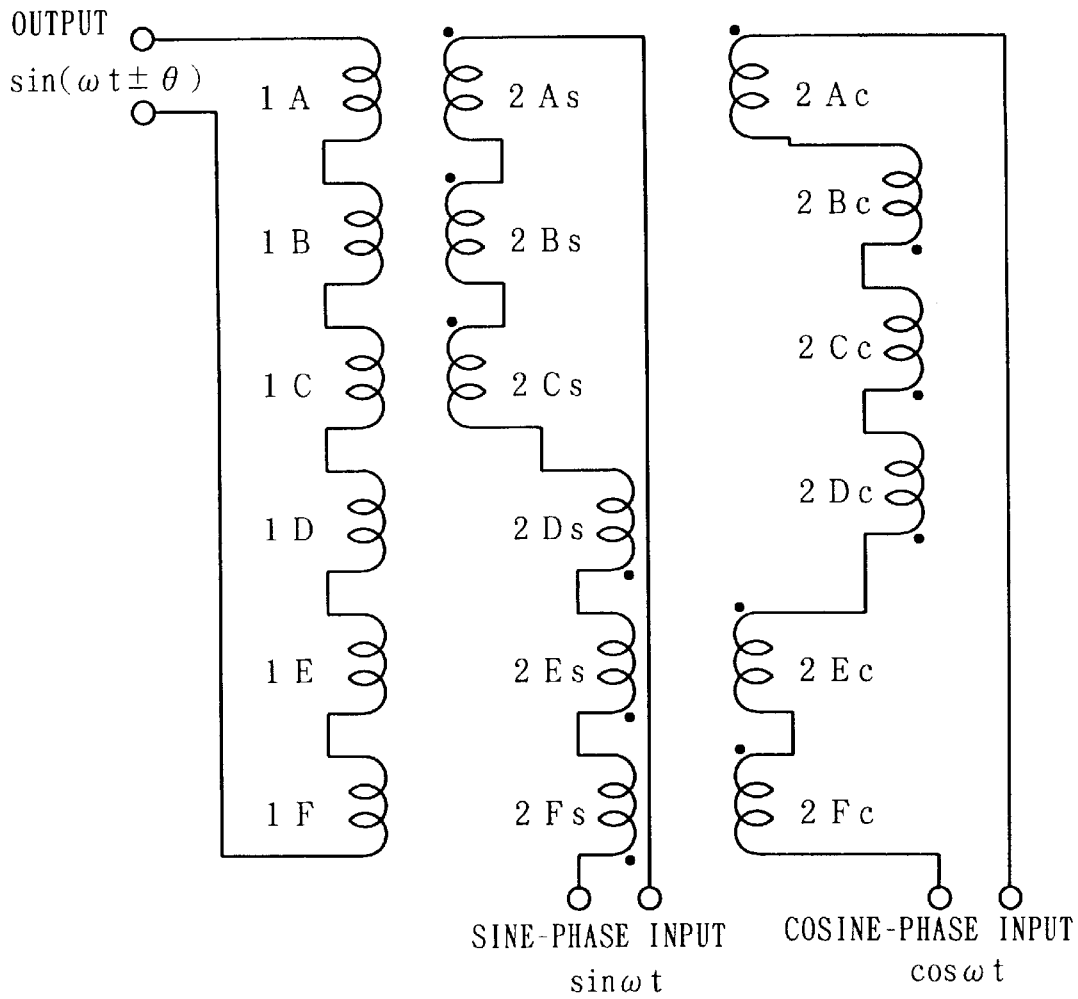
FIG. 16 is a winding diagram of still another embodiment of the rotational position detecting device in accordance with the present invention where the input/output relationship between primary and secondary windings is reversed from that of the embodiment of FIG. 1, showing exemplary excitation of primary windings and exemplary connection of the secondary windings.

The above description has been made about cases where the present invention is practiced as a detecting device of a type that produces multi-phase or single-phase output in response to a single-phase input; conversely, the present invention may be practiced as a device of a type that produces a single-phase output in response to multi-phase inputs, i.e., as a phase-type position detecting device. In such a case, the detecting device of the present invention may be identical in mechanical structure to the embodiments described above with reference to FIGS. 1 to 15, except that the primary and secondary windings have to be reversed. For example, in order to change the detecting device of the present invention with a mechanical structure of FIG. 1 into the two-phase inputs (two-phase excitation)/one-phase output type, the two groups of the secondary windings 2As to 2Fs and 2Ac to 2Fc are made primary windings and the primary windings 1A to 1F are made secondary windings in such a manner that a one-phase output is produced in response to two-phase inputs as shown in FIG. 16. Namely, in this case, respective inductance of the primary windings 2As to 2Fs and 2Ac to 2Fc of the two groups are set in accordance with predetermined distribution (sine and cosine functions). By thus exciting the sine-phase group primary windings 2As to 2Fs with a common A.C. signal sin ωt and exciting the cosine-phase group primary windings 2Ac to 2Fc with a common A.C. signal cos ωt phase-shifted from the signal sin ωt by 90°, signal sin (ωt±θ) indicative of an electrical phase shift corresponding to a rotational angle θ of an object to be detected is obtained as a single output signal that corresponds to a sum of induced voltages in the secondary windings 1A to 1F.

It will be appreciated that the present invention can implement not only the two-phase excitation/one-phase output type detecting device but also a three-phase excitation/one-phase output type or any other type detecting device.

Figure 17:
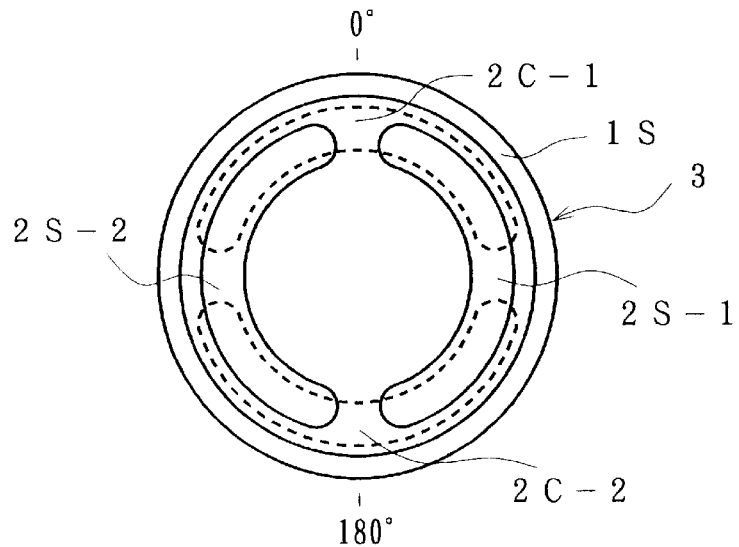
FIG. 17 is a schematic front view showing a stator in still another embodiment of the rotational position detecting device in accordance with the present invention where desired inductance distribution is provided through distributed windings.

While the above-described embodiments each employ a winding structure where the secondary (or primary) windings of each group achieving desired inductance distribution are independent of each other, a distributed winding structure may be employed. FIG. 17 shows an example of such a distributed winding structure, where the stator 3 has a multiplicity of slots (not shown) formed along the circumference thereof. In the stator 3, a winding 2S-1 corresponding to the first sine-phase subgroup is distributively wound over a range of rotational angles 0° to 180° so as to achieve inductance distribution corresponding to functional characteristics within a range from sin 0° to sin 180°, and another winding 2S-2 corresponding to the second sine-phase subgroup is distributively wound over a range of rotational angles 180° to 360° so as to achieve inductance distribution corresponding to functional characteristics within a range from sin 180° to sin 360°. The two windings 2S-1 and 2S-2 are connected to generate a single output signal corresponding to the sine phase.

Further, in the stator 3, another winding 2C-1 corresponding to the first cosine-phase subgroup is distributively wound over a range of rotational angles 270° to 90° so as to achieve inductance distribution corresponding to functional characteristics within a range from cos 270° to cos 90°, and another winding 2C-2 corresponding to the second cosine-phase subgroup is distributively wound over a range of rotational angles 90° to 270° so as to achieve inductance distribution corresponding to functional characteristics within a range from cos 90° to cos 270°. The two windings 2C-1 and 2C-2 are connected to generate a single output signal corresponding to the cosine phase. In the illustrated example of FIG. 17, the primary winding 1S is a single winding wound along the outermost periphery of the stator 3. In such a distributed winding structure as well, the relationship between the primary and secondary windings may be reversed; that is, the distributed windings 2S-1, 2S-2, 2C-1 and 2C-2 may be made primary windings.

The embodiments of the present invention have been described as achieving the magnetic coupling variations by the rotor in such a manner to have one variation cycle per complete rotation and setting inductance distribution of the winding groups to present variation characteristics of one cycle per complete rotation. Alternatively, the magnetic coupling variations by the rotor may be achieved in such a manner to have two or more variation cycles per complete rotation and inductance distribution of the winding groups may be set to present variation characteristics of two or more variation cycles per complete rotation.

Figure 18:
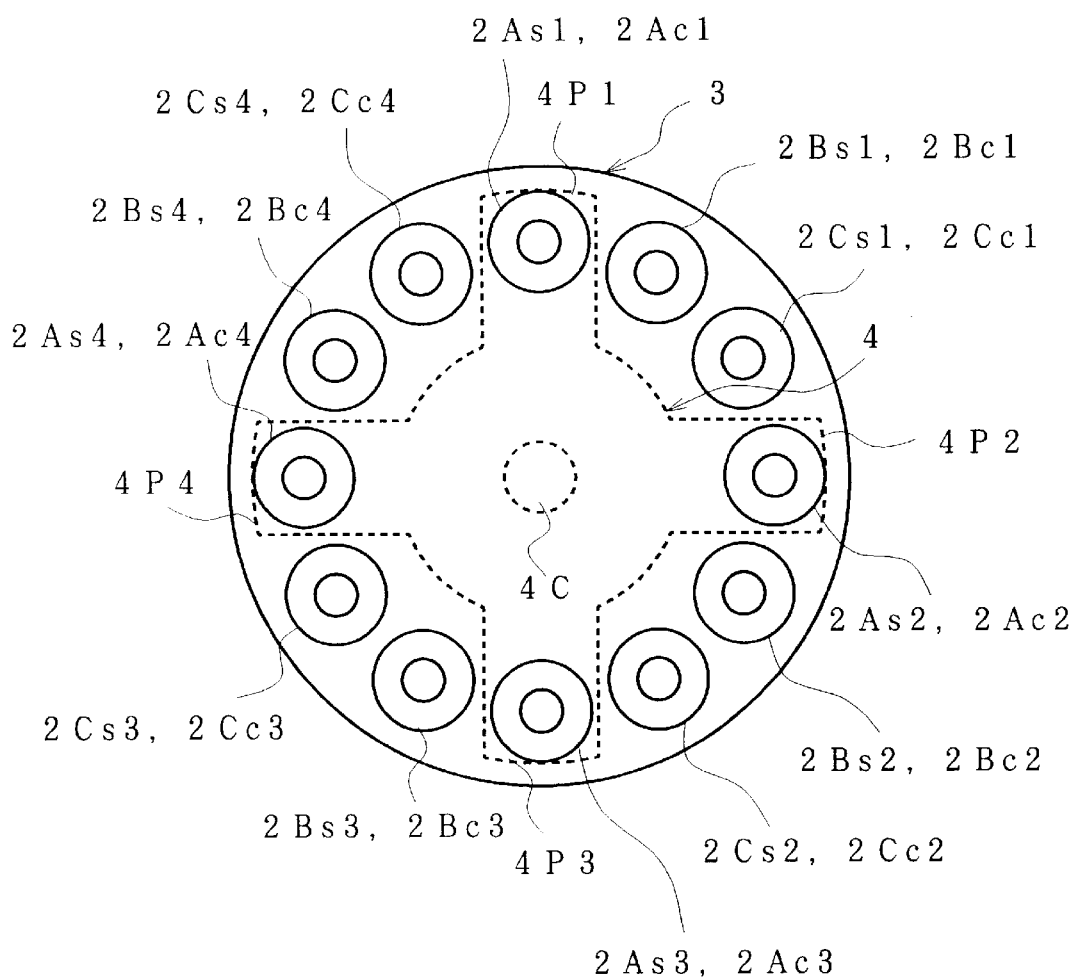
FIG. 18 is a schematic front view showing still another embodiment of the rotational position detecting device in accordance with the present invention which is designed to provide inductance distribution that presents a plurality of variation cycles per rotation.
Figure 19:
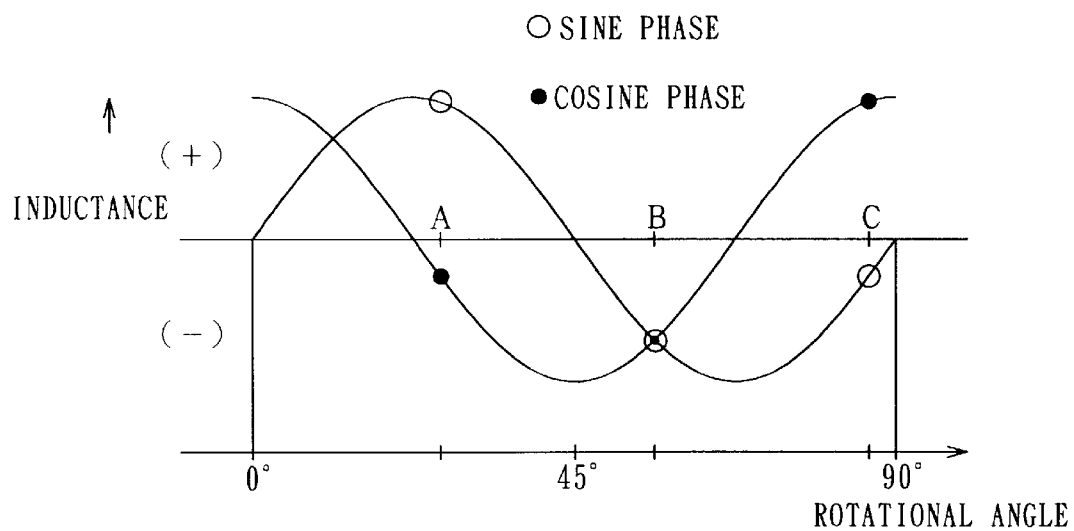
FIG. 19 is a graph showing an example of inductance distribution that is set for two groups of secondary windings shown in FIG. 18.

FIG. 18 schematically shows an example of the alternative, in which the rotor 4 includes four magnetic projections (or teeth) 4P1, 4P2, 4P3 and 4P4 extending radially outwardly and circumferentially spaced from each other at equal intervals (by 90°) so as to achieve four cycles of the magnetic coupling variations per rotation. The stator 3 includes 12 magnetic poles provided along the circumference thereof in spaced apart relations to each other. Sine-phase secondary windings 2As1, 2Bs1, 2Cs1; 2As2, 2Bs2, 2Cs2; 2As3, 2Bs3, 2Cs3; and 2Cs4; 2As4, 2Bs4, 2Cs4, and cosine-phase secondary windings 2Ac1, 2Bc1, 2Cc1; 2Ac2, 2Bc2, 2Cc2; 2Ac3, 2Bc3, 2Cc3; and 2Ac4, 2Bs4, 2Cs4 are provided on the 12 magnetic poles, one pair of the sine- and cosine-phase secondary windings on each of the magnetic poles. Respective inductance of the individual sine-phase secondary windings 2As1 to 2Cs4 is set in such a manner to present inductance distribution according to a sine function having four cycles per rotation; for instance, as shown in FIG. 19, inductance of the windings (e.g., 2As1, 2Bs1 and 2Cs1) for three poles (e.g., A, B and C) is set in such a manner that inductance distribution according to a one-cycle sine function is presented within a rotational angle range of 90°. Similarly, respective inductance of the individual cosine-phase secondary windings 2Ac1 to 2Cc4 is set in such a manner to present inductance distribution according to a cosine function having four cycles per rotation; for instance, as shown in FIG. 19, inductance of the windings (e.g., 2Ac1, 2Bc1 and 2Cc1) for three poles (e.g., A, B and C) is set in such a manner that inductance distribution according to a one-cycle cosine function is presented within a rotational angle range of 90°.

As set forth above, the rotational position detecting device of the present invention which presents output variation characteristics over two or more cycles per rotation, can be used in a similar manner to known high-resolution-type rotational position detecting devices having a "multi-teeth rotor".

Although not shown in FIG. 18, the primary winding may be provided in a variety of ways as described above. Further, in a similar manner to the above-mentioned, the relationship between the primary and secondary windings may be reversed, and the shape and material of the rotor 4 may be modified in a variety of ways as described above. In the illustrated example of FIG. 18, the intensity of magnetic fields around the individual magnetic poles in the stator 3 presents circular distribution while the magnetic projections 4P1 to 4P4 are of generally straight shape. Thus, by the straight-shape magnetic projections 4P1 to 4P4 moving across the circularly-distributed magnetic fields, magnetic coupling variations caused by the rotor 4 will present good characteristics that are approximate to trigonometric functional characteristics such as those of sine wave.

In both of the above-mentioned detecting device which presents one cycle of variation characteristics per rotation and the detecting device which presents two or more cycles of variation characteristics per rotation, the rotational position range may cover only part of the region corresponding to one cycle of the magnetic coupling variations caused by the rotor, rather than covering the whole of the region.

While in the described embodiments, the rotor 4 is generally in the shape of a plate and opposed to the stator 3 in the axial direction, the structure of the rotor 4 and structural relation of the rotor 4 relative to the stator 3 may be other than the foregoing. For example, the rotor may have a cylindrical shape (or an eccentric cylindrical shape) as a whole, and the rotor may be inserted in the interior space of the stator in such a manner that its radial direction corresponds to the direction of magnetic flux applied from the stator's magnetic poles to the rotor and the rotor is opposed to the stator in the radial direction.

In the above-described embodiments, each output signal generated from the secondary windings can be utilized as in conventionally known devices such as synchro devices, and position data corresponding to a detected rotational position can be subjected to any suitable signal processing or data processing to be obtained in digital or analog form, as known in the art. For example, it is a known technique to process two-phase resolver outputs via an A-to-D converter so as to obtain position data corresponding to a detected rotational position in digital form. Such a detecting circuit may be employed in the present invention as necessary. In such a case, output signals from the secondary windings may be pulled out from the detecting device through wiring and provided to an external detecting circuit, or the detecting circuit may be incorporated into an LSI or the like so as to be accommodated within the housing of the detecting device.

In addition, it should be obvious that the detecting device of the present invention can also be utilized in practicing a conventionally known technique which permits detection absolute rotational positions over a plurality of rotations by provision of a plurality of rotational position detecting devices to which the rotation of a rotary shaft to be detected is transmitted with different transmission ratios.

The present invention arranged in the above-mentioned manner is characterized in that one group of the secondary windings are distributively placed on the stator over a predetermined rotational position range and respective inductance of the secondary windings in that group is set in such a manner to present desired inductance distribution over the predetermined rotational position range. Thus, when the rotor, having a peculiar shape to cause variations in magnetic coupling at individual poles of the stator in response to its current rotational position, rotatively moves over the predetermined rotational position range, magnetic coupling variations occur in the secondary windings situated within the range in response to a changing rotational position of the rotor and levels of voltage induced in the individual secondary windings are determined in accordance with the inductance distribution. Consequently, by virtue of additive or multiplicative combined action of the two phenomena, an ultimate output signal resulting from summing respective outputs of the secondary windings in the group will advantageously have high accuracy and good linearity as a function of the rotational position of the rotor.

Further, because the present invention is not constructed to obtain variations in induction coefficients, responsive to a changing rotational position of the rotor, in dependence only on the shape of the rotor, the shaping, designing and manufacturing of the rotor are greatly facilitated, and sufficient detecting accuracy is achievable even when the detecting device is substantially reduced in size. Also, because the output signal is provided as a sum of the respective outputs of the individual secondary windings determined in accordance with desired inductance distribution within the predetermined rotational position range, a sort of averaging is effected, and this averaging is very advantageous in that it operates to minimize output errors even though the stator and rotor have some manufacturing and assembling errors. Namely, because the present invention can considerably lessen the assembling and manufacturing burdens, it can effectively promote reduction in costs and size of the detecting device while guaranteeing high detecting accuracy.

What is claimed is:

1. An induction-type rotational position detecting device comprising:

a stator having primary and secondary windings placed thereon; and a rotor rotatable relative to said stator, said rotor having a profile and composition to form an airgap between said rotor and stator and to cause variation in magnetic coupling between said primary and secondary windings on said stator in response to a rotational position of said rotor;

wherein said rotational position detecting device includes a plurality of groups each having a plurality of said secondary windings placed on said stator, said plurality of said secondary windings in each group being distributed over a predetermined rotational position range and having non-uniform inductance to present a predetermined inductance distribution over the predetermined rotational position range with the inductance of each of said secondary windings differing from the inductance of at least another of said secondary windings, said primary winding being excited by a single-phase exciting input at least in correspondence with said group, respective outputs of said secondary windings being summed to generate a single output signal;

wherein the inductance distribution of said plurality of groups is shifted from each other by a predetermined mechanical angle, and there are one or more overlapping portions in said predetermined rotational position ranges covered by said groups.

2. An induction-type rotational position detecting device as defined in claim 1 wherein said secondary windings in said one group are non-uniform in number of turns to thereby present the predetermined inductance distribution over the predetermined rotational position range.

3. An induction-type rotational position detecting device as defined in claim 1 wherein said rotational position detecting device includes a couple of said groups, and the inductance distribution of said groups is shifted from each other by a predetermined mechanical angle of about 90°, and wherein two-phase outputs are generated in response to a single-phase exciting input.

4. An induction-type rotational position detecting device as defined in claim 1 wherein said rotational position detecting device includes three said groups, and the inductance distribution of said groups is shifted from each other by a predetermined mechanical angle of about 120°, and wherein three-phase outputs are generated in response to a single-phase exciting input.

5. An induction-type rotational position detecting device as defined in claim 1 wherein said inductance distribution has a trigonometric functional characteristic.

6. An induction-type rotational position detecting device as defined in claim 1 which further comprises a magnetic core sheet provided on one surface of said stator opposite to said rotor, said magnetic core sheet having magnetic pole portions formed thereon in corresponding relations to magnetic poles of said windings on said stator.

7. An induction-type rotational position detecting device comprising:

a stator having primary and secondary windings placed thereon; and a rotor rotatable relative to said stator, said rotor having a profile and composition to form an airgap between said rotor and stator and to cause variation in magnetic coupling between said primary and secondary windings on said stator in response to a rotational position of said rotor, said primary winding being excited by plural-phase exciting inputs;

wherein said rotational position detecting device includes, in correspondence with the plural-phase exciting inputs, a plurality of groups each having a plurality of said secondary windings placed on said stator, said plurality of said secondary windings in each of said groups being distributed over a predetermined rotational position range and having non-uniform inductance to present a predetermined inductance distribution over the predetermined rotational position range with the inductance of each of said secondary windings differing from the inductance of at least another of said secondary windings, the inductance distribution of said groups being shifted from each other by a predetermined mechanical angle;

wherein there are one or more overlapping portions in said predetermined rotational position ranges covered by said groups.

8. An induction-type rotational position detecting device as defined in claim 7 wherein said secondary windings in said groups are non-uniform in number of turns to thereby present the predetermined inductance distribution over the predetermined rotational position range.

9. An induction-type rotational position detecting device as defined in claim 7 wherein said rotational position detecting device includes a couple of said groups, and the inductance distribution of said groups is shifted from each other by a predetermined mechanical angle of about 90°, and wherein a single-phase output is generated in response to two-phase exciting inputs.

10. An induction-type rotational position detecting device as defined in claim 7 wherein said rotational position detecting device includes three said groups, and the inductance distribution of said groups is shifted from each other by a predetermined mechanical angle of about 120°, and wherein a single-phase output is generated in response to three-phase exciting input.

11. An induction-type rotational position detecting device as defined in claim 7 wherein said inductance distribution has a trigonometric functional characteristic.

12. An induction-type rotational position detecting device as defined in claim 7 which further comprises a magnetic core sheet provided on one surface of said stator opposite to said rotor, said magnetic core sheet having magnetic pole portions formed thereon on corresponding relations to magnetic poles of said windings on said stator.

13. An induction-type rotational position detecting device comprising:

a stator having primary and secondary windings placed thereon; and a rotor rotatable relative to said stator, said rotor having a (predetermined) profile and composition to form an airgap between said rotor and said stator and to cause variation in magnetic coupling between said primary and secondary windings on said stator in response to a rotational position of said rotor, wherein at least one of said primary and secondary windings include a plurality of groups each having a plurality of windings that are distributed over a predetermined rotational position range and have non-uniform inductance to present a predetermined inductance distribution over the predetermined rotational position range with the inductance of each of said windings differing from the inductance of at least another of said windings;

wherein the inductance distribution of said groups is shifted from each other by a predetermined mechanical angle, and there are one or more overlapping portions in said predetermined rotational position ranges covered by said groups.

14. An induction-type rotational position detecting device as defined in claim 13 wherein said rotational position detecting device includes a couple of said groups, and the inductance distribution of said groups is shifted from each other predetermined mechanical angle of about 90°.

15. An induction-type rotational position detecting device as defined in claim 13 wherein said rotational position detecting device includes three said groups, and the inductance distribution of said groups is shifted from each other by a determined mechanical angle of about 120°.

16. An induction-type rotational position detecting device as defined in claim 13 wherein said inductance distribution has a trigonometric functional characteristic.

17. An induction-type rotational position detecting device as defined in claim 13 which further comprises a magnetic core sheet provided on one surface of said stator opposite to said rotor, said magnetic core sheet having magnetic pole portions formed thereon in corresponding relations to magnetic poles of said windings on said stator.

* * * * *